United States Patent [19]

Liesenfeld et al.

[11] Patent Number: 4,717,574
[45] Date of Patent: Jan. 5, 1988

[54] PROCESS FOR PRODUCING NATURALLY PRESERVED RAW MEAT PRODUCTS

[76] Inventors: Emil Liesenfeld, Bopparder Str. 65; Edgar Liesenfeld, Lämmergasse 6, both of D-5404 Bad Salzig, Fed. Rep. of Germany

[21] Appl. No.: 740,908

[22] PCT Filed: Sep. 30, 1983

[86] PCT No.: PCT/DE83/00168
§ 371 Date: Jul. 19, 1985
§ 102(e) Date: Jul. 19, 1985

[87] PCT Pub. No.: WO85/01419
PCT Pub. Date: Apr. 11, 1985

[51] Int. Cl.$^4$ ................................................. A23L 1/31
[52] U.S. Cl. ................................. 426/315; 426/478; 426/513
[58] Field of Search ....... 426/641, 478, 512, 513, 315

[56] References Cited

U.S. PATENT DOCUMENTS

| 149,631 | 4/1874 | Atkinson | 426/478 |
| 2,037,892 | 4/1936 | Gleason | 426/478 |
| 2,673,156 | 3/1954 | Minder | 426/513 |
| 3,098,747 | 7/1963 | Dubil | 426/478 X |
| 4,072,763 | 2/1978 | Mart | 426/513 |
| 4,537,781 | 8/1985 | Van der Velde et al. | 426/478 |

FOREIGN PATENT DOCUMENTS 449499 6/1936 United Kingdom ................ 426/478

*Primary Examiner*—Arthur L. Corbin
*Attorney, Agent, or Firm*—Marmorek, Guttman & Rubenstein

[57] ABSTRACT

A method and an apparatus for preserving raw meat products are described. The meat products are lightly salted and placed atop each other in a compressive vessel. The vessel has a lid which is movable in the vertical direction and capable of exerting pressure on the meat products. The meat products are subjected to periods of increasing and then decreasing pressures. In this way, juices from the meat are squeezed out. These juices act as a preservation brine for the meat.

6 Claims, No Drawings

PROCESS FOR PRODUCING NATURALLY PRESERVED RAW MEAT PRODUCTS

This invention relates to a process and the associated apparatus for producing naturally preserved raw meat products by salting them in a revolving drum partially filled with salt.

In the conventional production of durable, raw preserved meat products, a time-consuming main salting process must be carried out that extends over several weeks, in which the pieces of meat are placed between layers of preserving salt and in this way treated. Besides the amount of time required, this so-called dry-salting process has the disadvantage that any desired uniform distribution of salt in the meat pieces is must be processed in a non-uniform way since it depends on the size and quality of the pieces of meat as well as on many other factors. This, as a rule, results in over-salting and, consequently, in a loss of the original flavor in the end product.

This invention proposes to change this time-consuming process by making it possible to produce preserved meat products not only considerably quicker, but also with less salt, and being of a more uniform quality than it has heretofore been possible.

In accordance with the present invention, this task is accomplished by placing two or more layers of salted pieces of meat tightly next to and over each other in a compressive vessel having a lid that is freely movable in the perpendicular direction. This vessel acts on the entire package of meat pieces by applying periodical surges in pressure. During this periodical change in pressure that lasts several hours, the intermediate spaces between the pieces of meat are filled with their own pressed-out preservation brine, whereafter the pieces of meat thus kneaded are removed from the vessel and put in an air-drying apparatus and/or are subjected to a smoke process.

It is convenient to provide resting pauses of two or more time periods between periodical pressure changes.

The maximum and/or minimum pressures may be kept constant for short periods of time.

To carry out this process, the apparatus of this invention comprises a compressive vessel and a lid that can be moved up and down by a driving mechanism.

It will be convenient to form the lid with a weight that is about one-tenth of the weight of the whole package of meat pieces.

The above-described process replaces conventional dry-salting processes used heretofore and the thereto related manual work, resulting in a corresponding gain of time. The proposed hydraulic kneading of the meat pieces leads to a uniform distribution of the salt in the meat pieces within the shortest possible time, wherein the meat structure is preserved undamaged.

By the end of the kneading of the meat in the salt-containing juices coming from the meat, the salt content of the brine proper is reduced to about one-half of the original substance.

Meat with a pH-value of over 5.8 to 6, that heretofore had been found inappropriate for producing raw preserved meat products, can now be used by employing the proposed process and another preservation process. In this case, it is only necessary to knead the meat for a longer period of time.

It has been further ascertained that the kneading process leads to a measurable decrease in nitrate. Thus, a possible accumulation of nitrosamines in the human body which, according to the newest theories are thought to be carcinogenic, can be counteracted.

We claim:

1. A process for preserving raw meat products, comprising
   treating said meat products with salt,
   placing said meat products atop one another in layers in a compressive vessel, and
   kneading said meat products by subjecting them to periodic surges of increasing mechanical pressure to remove juices from said meat products, each surge being followed by a decrease in pressure to return removed juices to said meat products, whereby juices within said meat products pass in and out of said meat products and said salt is distributed uniformly within said meat products.

2. The process of claim 1 wherein said periods of increasing and decreasing pressure last two or more hours.

3. The process of claim 1 further comprising allowing said meat products to remain at ambient pressure before beginning each period of increasing pressure.

4. The process of claim 1 further comprising maintaining said meat products for a period of time at a maximum pressure at the end of each stage of increasing pressure and at a minimum pressure at the end of each stage of decreasing pressure.

5. The process of claim 1 wherein said compressive vessel has a vertical movable lid, and wherein said pressure is exerted mechanically by said lid.

6. The process of claim 1 further comprising smoking said kneaded meat products.

* * * * *